United States Patent
Khafagy et al.

(10) Patent No.: US 10,371,112 B1
(45) Date of Patent: Aug. 6, 2019

(54) METHODS AND SYSTEMS FOR ACTIVATING A STOP/START ENGINE

(71) Applicant: Ford Global Technologies, LLC, Dearborn, MI (US)

(72) Inventors: Hafiz Khafagy, Dearborn, MI (US); Hussam Makkiya, Troy, MI (US); Ahmed Awadi, Farmington Hills, MI (US); Eric Rademacher, Beverly Hills, MI (US); Siraj Siddiqui, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/893,374

(22) Filed: Feb. 9, 2018

(51) Int. Cl.
*F02N 11/08* (2006.01)
*F02N 11/00* (2006.01)

(52) U.S. Cl.
CPC ........ *F02N 11/0803* (2013.01); *F02N 11/003* (2013.01); *F02N 2300/306* (2013.01)

(58) Field of Classification Search
CPC .............. Y02T 10/48; B60W 30/18018; F02N 11/0822; F02N 11/0818; F02N 11/0814; F02N 11/084; F02N 11/0837; F02N 11/0833; F02N 11/0829; F02N 11/0844; F02N 11/0803

USPC ........................................ 123/179.4; 701/112
See application file for complete search history.

(56) References Cited

U.S. PATENT DOCUMENTS

| | | | |
|---|---|---|---|
| 8,751,062 B2 | 6/2014 | Van Wiemeersch | |
| 2008/0117079 A1* | 5/2008 | Hassan | B60R 25/045 340/901 |
| 2011/0068895 A1* | 3/2011 | Gee | B60R 25/00 340/5.67 |
| 2013/0079952 A1* | 3/2013 | Fazi | F02D 45/00 701/2 |
| 2015/0267628 A1* | 9/2015 | Bohn | F02N 11/0814 701/112 |
| 2017/0253245 A1 | 9/2017 | Khafagy et al. | |
| 2017/0259803 A1 | 9/2017 | Khafagy et al. | |

* cited by examiner

*Primary Examiner* — Sizo B Vilakazi
(74) *Attorney, Agent, or Firm* — Julia Voutyras; McCoy Russell LLP

(57) ABSTRACT

Systems and methods for improving operation of a vehicle are presented. In one example, a controller notifies a human vehicle driver before electric power consumers that are electrically coupled to the vehicle are deactivated. The controller may notify the human driver in response to a state of charge of a vehicle battery.

19 Claims, 5 Drawing Sheets

METHODS AND SYSTEMS FOR ACTIVATING A STOP/START ENGINE

FIELD

The present description relates to a system and methods for improving vehicle operation and power consumption. The methods may be particularly useful for engines that are frequently stopped and restarted to conserve fuel.

BACKGROUND AND SUMMARY

Engine emissions and fuel consumption may be reduced by automatically stopping an engine of a vehicle without a human driver providing input to a device that has a sole purpose or function of stopping engine rotation. The engine may be automatically stopped for as long of a period as driver demand torque is low; however, the engine may be automatically restarted if battery state of charge is low so that there is sufficient electrical energy to restart the engine. Nevertheless, an automatically stopped engine may not be restarted and electrical power may not be supplied to electrical power consumers if the human driver leaves the vehicle's passenger cabin. The engine may remain stopped and electrical power consumers may be deactivated after the human driver exits the vehicle so that the vehicle may have sufficient electrical energy to restart the engine at a later time. Further, deactivating the engine ensures that a third party may not drive off in the vehicle without the human driver's permission. A vehicle that operates in this way may be desirable to ensure engine restarting and prevention of unauthorized vehicle operation, but it also prevents vehicle systems from updating when the human driver leaves the vehicle. In addition, other vehicle occupants may not have the benefit of using the vehicle electrical energy consumers when the human driver leaves the vehicle.

The inventors herein have recognized the above-mentioned disadvantages and have developed a method for operating an engine, comprising: automatically stopping an engine via a controller; and via the controller, sending a notification to a human driver of a vehicle while the engine is automatically stopped that one or more electric power consumers coupled to a vehicle will be deactivated in a predetermined amount of time unless the human driver performs an engine reactivation procedure at the vehicle, the human driver not occupying the vehicle.

The vehicle's electrical energy consumers may remain active after the vehicle's engine has been automatically stopped and the vehicle's human driver has left the vehicle passenger cabin via notifying a human driver that one or more vehicle electric power consumers will be deactivated in a predetermined amount of time. Further, the engine may not be automatically restarted by a third party simply entering the vehicle because verification of an operator's identity may be required before the engine may be automatically restarted. Thus, it may be possible to provide the technical result of allowing vehicle systems to remain online and operational without a third party being able to drive off in the vehicle by simply entering the vehicle and engaging the transmission. In this way, it may be possible to allow electrical systems to remain updated and vehicle passengers to be entertained after a human driver has exited a vehicle having an engine that has been automatically stopped.

The present description may provide several advantages. Specifically, the approach may reduce engine fuel consumption by allowing an engine to remain in an off state for a longer period of time. Further, the approach may allow vehicle electrical power consuming systems to remain in an updated state after a driver exits a vehicle. Further still, the approach may help to ensure that a vehicle has sufficient electrical energy to restart an engine after the engine has been automatically stopped.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
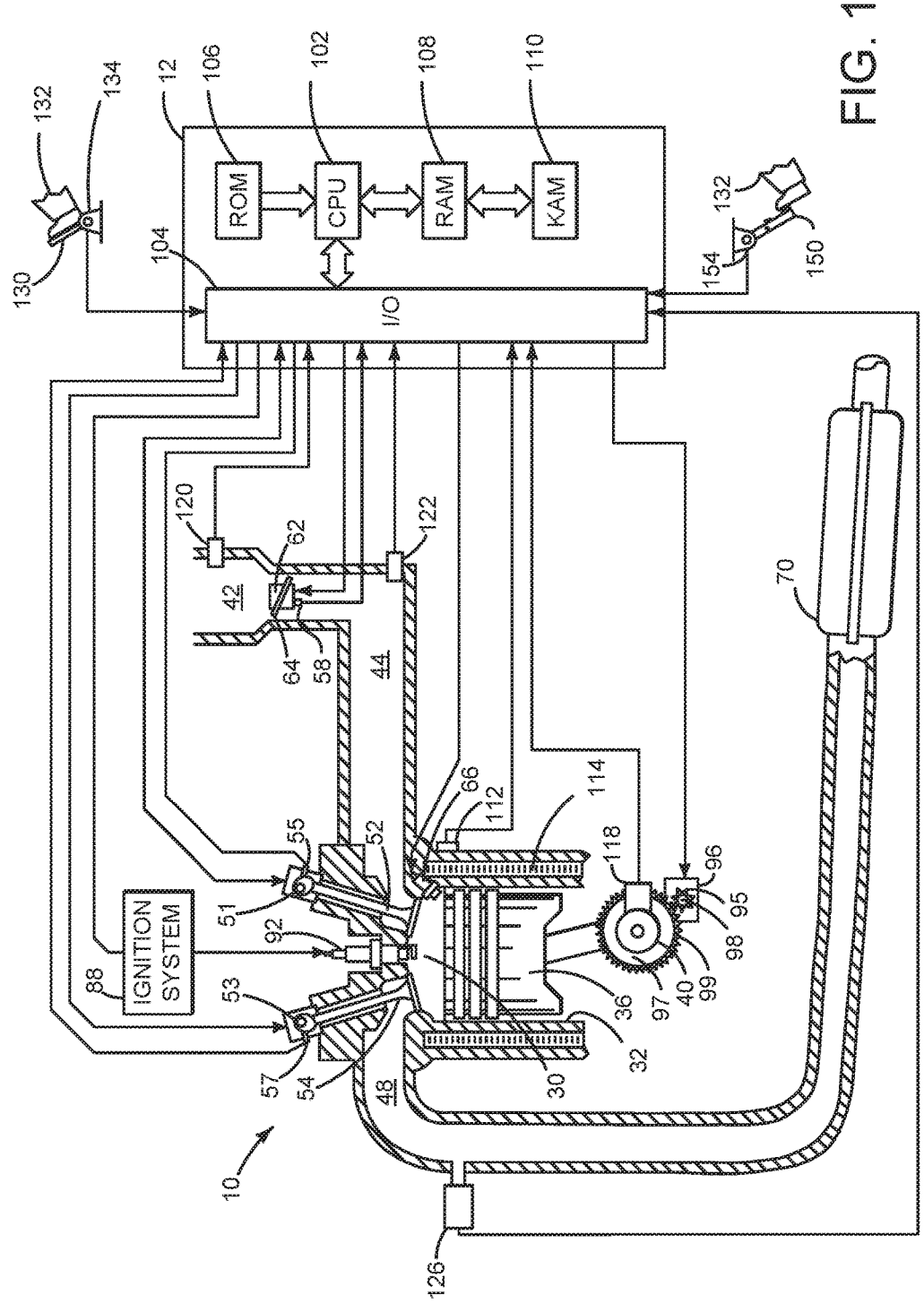
FIG. 1 is a schematic diagram of an engine.
Figure 2:
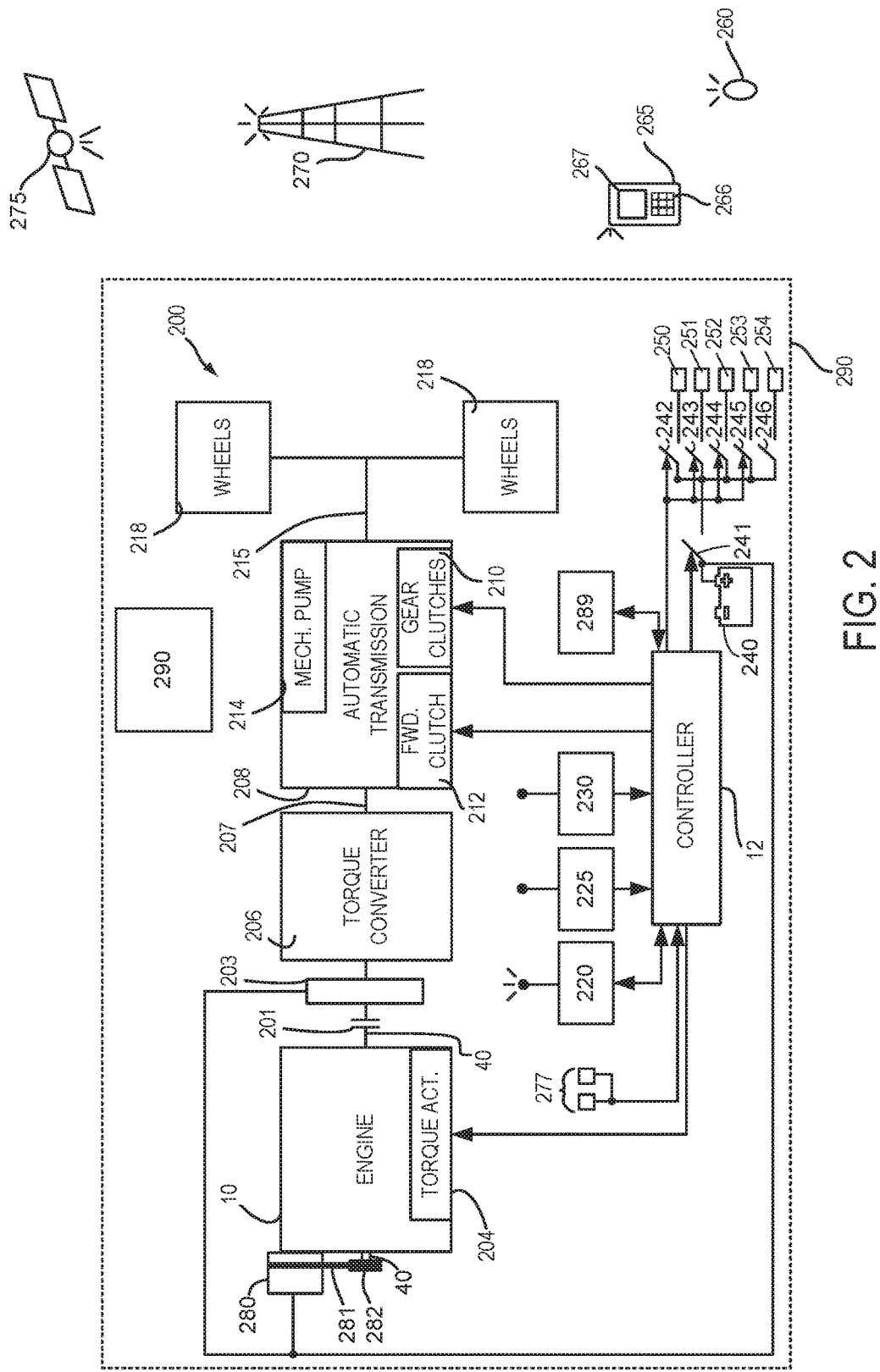
FIG. 2 shows an example vehicle driveline.
Figure 3:
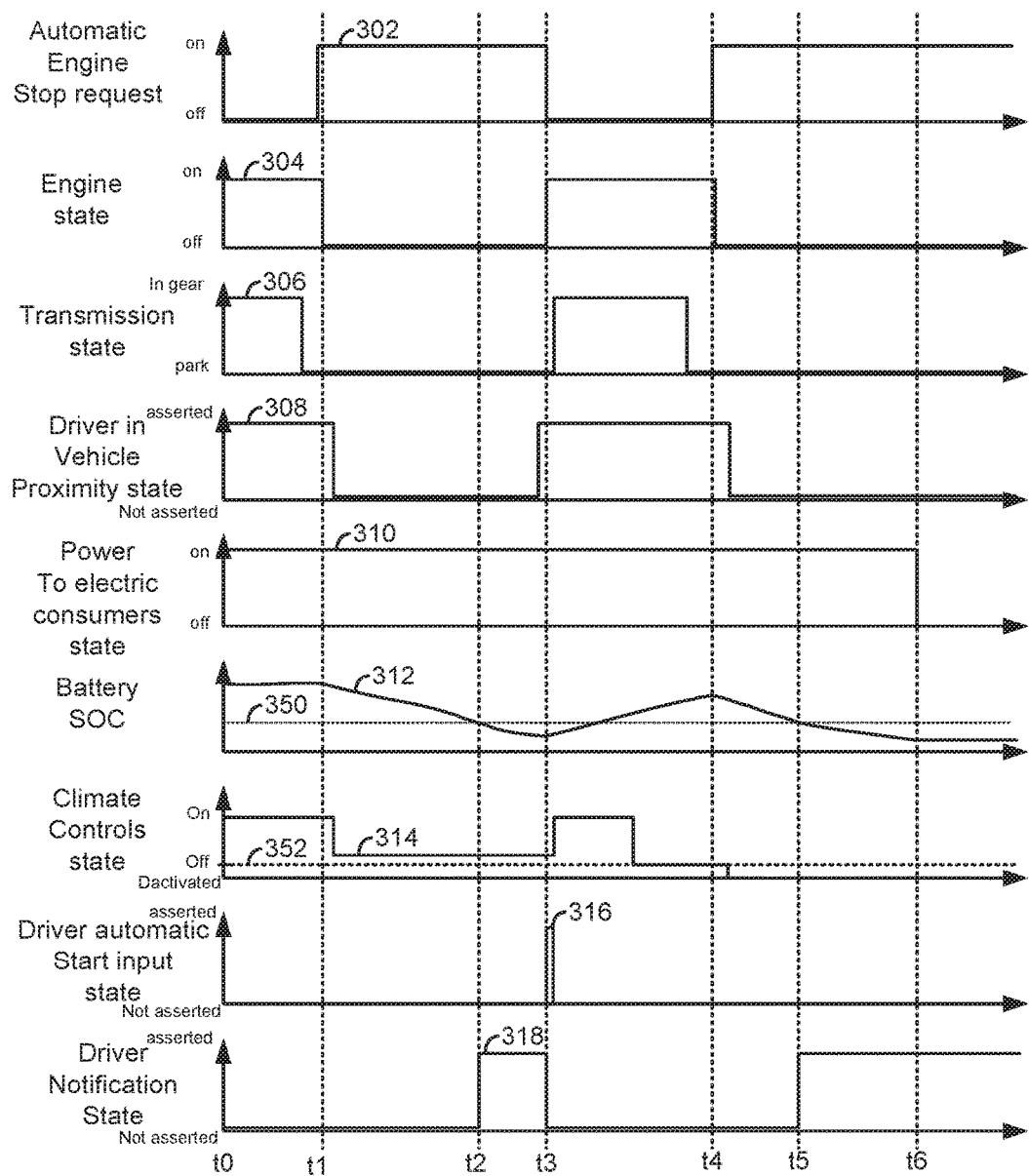
FIG. 3 shows an example prophetic engine operating sequence according to the method of FIGS. 4 and 5.

The present description is related to controlling engine operation of a vehicle. The vehicle may include an engine as a sole source of torque for propelling the vehicle. Alternatively, the vehicle may include an engine and a motor that both supply torque to propel the vehicle. FIG. 1 shows an example engine system. The engine may be included in a driveline as is shown in FIG. 2. The engine and vehicle may operate as is shown in the sequence of FIG. 3. The engine and vehicle components may be operated according to the method of FIGS. 4 and 5. The term "driver" may be referred to throughout this specification and it refers to a human driver or human vehicle operator that is the authorized operator of the vehicle unless otherwise indicated.

Referring to FIG. 1, internal combustion engine 10 comprises a plurality of cylinders, one cylinder of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a block diagram of a vehicle 290 including a powertrain or driveline 200. The powertrain of FIG. 2 includes engine 10 shown in FIG. 1. Powertrain 200 is shown including controller 12, which may communicate with passenger cabin climate control system 289. Climate control system 289 may heat or cool passenger cabin 290. In one example, climate control system 289 includes a heat pump.

In this example, powertrain 200 may be powered by engine 10 and electric machine 203. Engine 10 may be started with an engine starting system shown in FIG. 1, via belt driven integrated starter/generator (BISG) 280, or via driveline integrated starter/generator (ISG) 203 also known as a motor/generator. Further, torque of engine 10 may be adjusted via torque actuator 204, such as a fuel injector, throttle, etc.

BISG 280 is mechanically coupled to engine 10 via belt 281 and pulley 282. BISG 280 may be coupled to crankshaft 40 or a camshaft (e.g., 51 or 53). BISG 280 may operate as a motor when supplied with electrical power via electric energy storage device 275. BISG 280 may operate as a generator supplying electrical power to electric energy storage device 240 (e.g., a battery or capacitor).

An engine output torque may be transmitted to driveline disconnect clutch 201, which may be electrically or hydraulically actuated. Driveline disconnect clutch 201 is also mechanically coupled to ISG 203. ISG 203 may be operated to provide torque to powertrain 200 or to convert powertrain torque into electrical energy to be stored in electric energy storage device 240 in a regeneration mode. ISG 203 is in electrical communication with energy storage device 240. ISG 203 has a higher output torque capacity than starter 96 shown in FIG. 1 or BISG 280. Further, ISG 203 directly drives powertrain 200 or is directly driven by powertrain

200. There are no belts, gears, or chains to couple ISG 203 to powertrain 200. Rather, ISG 203 rotates at the same rate as powertrain 200. ISG 203 is also mechanically coupled to torque converter 206. ISG 203 may provide a positive torque or a negative torque to powertrain 200 via operating as a motor or generator as instructed by controller 12. It should be noted that this example shows a single controller. However, in other examples, the functions and operations performed via controller 12 may be distributed between a plurality of controllers.

Torque converter 206 is mechanically coupled to automatic transmission 208 via transmission input shaft 207. Torque converter 206 may also include a torque converter bypass lock-up clutch (not shown). Automatic transmission 208 includes gear clutches (e.g., gears 1-10) 210 and forward clutch 212. Automatic transmission 208 is a fixed step ratio transmission. The gear clutches 210 and the forward clutch 212 may be selectively engaged to change a ratio of an actual total number of turns of input shaft 207 to an actual total number of turns of wheels 218. Gear clutches 210 may be engaged or disengaged via adjusting fluid supplied to the clutches via shift control solenoid valves (not shown). Torque output from the automatic transmission 208 may also be relayed to wheels 218 to propel the vehicle via output shaft 215. Specifically, automatic transmission 208 may transfer an input driving torque at the input shaft 207 responsive to a vehicle traveling condition before transmitting an output driving torque to the wheels 216. Controller 12 may selectively activate a torque converter clutch (not shown), gear clutches 210, and forward clutch 212. Controller 12 may also selectively deactivate or disengages a torque converter clutch (not shown), gear clutches 210, and forward clutch 212.

In response to a request to accelerate vehicle 290, controller 12 may obtain a driver demand torque or power request from an accelerator pedal or other device. Controller 12 then allocates a fraction of the requested driver demand torque to the engine and the remaining fraction to the ISG 203 or BISG 280. Controller commands engine 10, ISG 203, and BISG 280 to generate commanded torques. If the ISG torque plus the engine torque is less than a transmission input torque limit (e.g., a threshold value not to be exceeded), the torque is delivered to torque converter 206, which then relays at least a fraction of the requested torque to transmission input shaft 207. The transmission torque converter clutch (not shown) may be locked and gears may be engaged via gear clutches 210 in response to shift schedules and torque converter clutch lockup schedules that may be based on transmission input shaft torque and vehicle speed. In some conditions when it may be desired to charge electric energy storage device 240, a charging torque (e.g., a negative ISG torque) may be requested while a non-zero driver demand torque is present. Controller 12 may request increased engine torque to overcome the charging torque to meet the driver demand torque.

In response to a request to decelerate vehicle 290 and provide regenerative braking, controller 12 may provide a negative desired wheel torque based on vehicle speed and brake pedal position. Controller 12 then allocates a fraction of the negative desired wheel torque to the ISG 203 (e.g., desired powertrain wheel torque) and/or engine 10, and the remaining fraction to friction brakes (not shown). Further, controller 12 may shift gears 211 based on a unique shifting schedule to increase regeneration efficiency. ISG 203 supplies a negative torque to transmission input shaft 207, but negative torque provided by ISG 203 may be limited. Further, negative torque of ISG 203 may be limited (e.g., constrained to less than a threshold negative threshold torque) based on operating conditions of electric energy storage device 240, by controller 12. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or ISG 203 because of transmission or ISG limits may be allocated to friction brakes (not shown) so that the desired wheel torque is provided by a combination of negative wheel torque from friction brakes (not shown), engine 10, and ISG 203.

Engine torque may be controlled by controller 12 adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may control also torque output and electrical energy production from ISG 203 by adjusting current flowing to and from field and/or armature windings of ISG as is known in the art.

Controller 12 may receive transmission input shaft position via a position sensor (not shown) and convert transmission input shaft position into input shaft speed via differentiating a signal from the position sensor. Controller 12 may receive transmission output shaft torque from a torque sensor (not shown). Controller 12 may also receive addition transmission information from sensors 277, which may include but are not limited to pump output line pressure sensors, transmission hydraulic pressure sensors (e.g., gear clutch fluid pressure sensors), ISG temperature sensors, driver in driver seat detection switch, driver's door switch, heart beat sensors, BISG temperature sensors, and ambient temperature sensors.

Controller 12 may communicate with satellite 275 via transceiver 220. Alternatively, transceiver 220 may be a transmitter-receiver. Controller 12 may broadcast vehicle data and requests for driver input to satellite 275 via transceiver 220 when the driver exits the vehicle as is described in further detail with regard to FIGS. 4 and 5. Controller 12 may also communicate with cellular network 270 via transceiver 225. Alternatively, transceiver 225 may be a transmitter-receiver. Controller 12 may broadcast vehicle data and requests for driver input to cellular network 270 via transceiver 225 when the driver exits the vehicle as is described in further detail with regard to FIGS. 4 and 5. Cellular network 270 may communicate data and requests to mobile device 265 (e.g., phone, note pad, computer, etc.). Mobile device 265 may include a display 267 and a human machine interface 266 (e.g., keyboard and/or microphone). Mobile device 265 may include software applications (e.g., executable instructions stored in non-transitory memory) for requesting control of driveline 200. Controller 12 may also receive requests from remote key fob 260 via receiver 230. In particular, key fob 260 may transmit a security token (e.g., a unique data set) to controller 12 to authorize starting and operation of driveline 200 when a human driver is within vehicle 290. Key fob 260 may transmit the security token when it enters a predetermined proximity (e.g., within 10 meters) of vehicle 290. The security token may authorize starting of vehicle 290, including engine 10, when vehicle 290 has been automatically stopped after the driver has left the vehicle's proximity (e.g., within 10 meters). The security token may also authorize starting of the vehicle, including starting the engine 10, activating the BISG 280, and activating the ISG 203, when the driver has stopped the engine and vehicle (e.g., no engine rotation and no electric machine rotation). The security token may be used to confirm an identity of a driver. Further, key fob 260 may request remote starting of engine 10, BISG 280, and ISG 203. Key fob 260 may confirm a driver's identity via biometric recognition. For example, key fob 260 may compare attributes of a key fob holder against attributes of an authorized key fob holder (e.g., the driver). The key fob may detect the key fob holder's attributes (e.g., fingerprint, voiceprint, retina scan, etc.) before broadcasting data to controller 12. Thus, the driver's identity may be confirmed via the key fob data sequence and a biometric scan that is performed on the holder of the key fob by the key fob. If the driver's identity or key fob holder's identity is not confirmed as an authorized user, then key fob 260 does not send the token to controller 12 and controller 12 does not respond to commands or requests from key fob 260.

Electric power consumers 250-254 may selectively receive electrical power from electric energy storage device 240 (e.g., battery, capacitor, etc.). Controller may close contactor 241 to establish electrical communication between electric energy storage device 240 and electric power consumers 250-254. Switches 242-246 may be selectively opened and closed via controller 12 to control electric power distribution to individual electric power consumers. For example, controller 12 may close contactor 241 and switch 242 to provide electrical power to electric power consumer 250. Further, controller 12 may close contactor 241, open switch 242 and close switches 243-246 to deactivate electric power consumer 250 and activate electric power consumers 251-254. Thus, controller 12 may control electric power flow individually to electric power consumers 250-254. Electric power consumers 250-254 may include but are not limited to computers, two-way radios, lights, infotainment systems, DC to AC inverters, power supplies, coolers, etc. The actual number of vehicle electric consumers and switches may be less than or greater than the number of switches and vehicle electric power consumers that are shown in FIG. 2.

Thus, the system of FIGS. 1 and 2 provides for a vehicle system, comprising: an engine; one or more electrical energy consumers that are in selective electrical communication with an electric energy storage device; and an engine controller coupled to the engine, the engine controller including executable instructions stored in non-transitory memory to automatically stop the engine via the controller, determine electric energy device state of charge, and notify a human driver that the one or more electrical energy consumers will be deactivated if the human driver does not perform an engine starting procedure within a predetermined amount of time. The vehicle system includes where notifying the human driver includes sending data to the human driver via a cellular communication network. The vehicle system includes where notifying the human driver includes sending data to the human driver via a satellite. The vehicle system includes where notifying the human driver includes sending data to the human driver via a radio frequency. The vehicle system further comprises additional instructions to automatically start the engine in response to the human driver performing an engine starting procedure. The vehicle system further comprises additional instructions to verify an identity of the human driver before automatically starting the engine.

Figure 4:
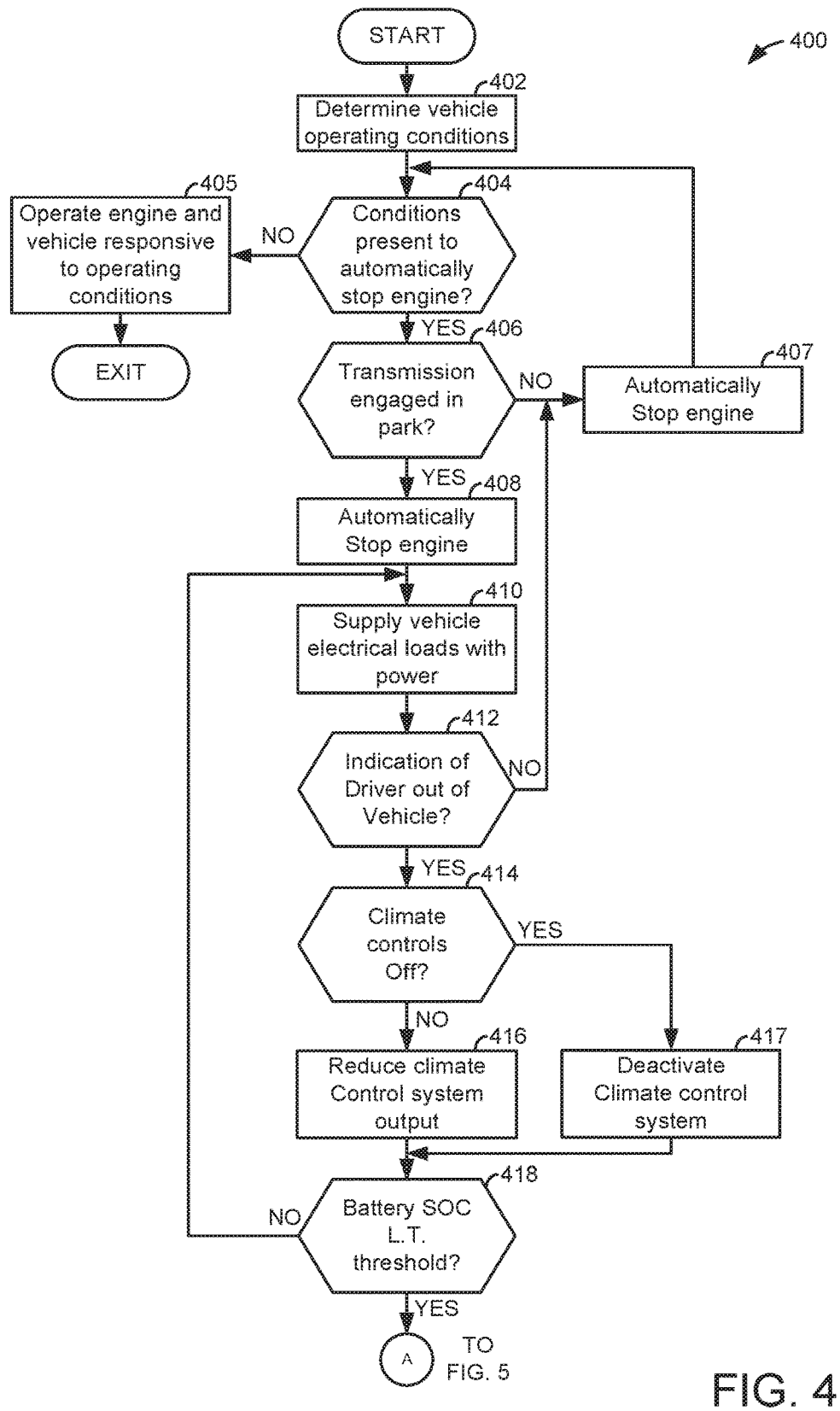
FIGS. 4 and 5 show an example flowchart of a method for operating an engine.
Figure 5:
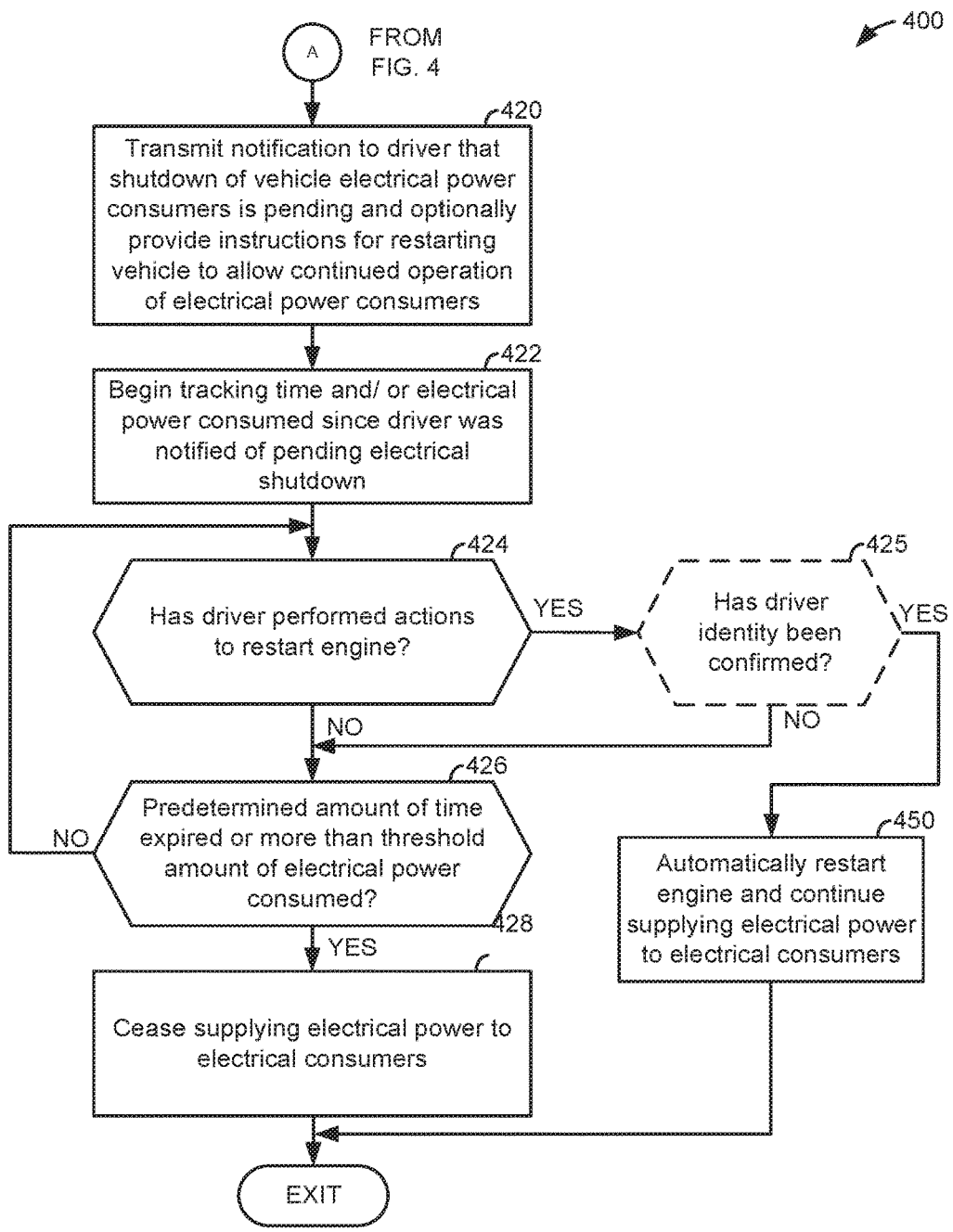

Referring now to FIG. 3, an engine operating sequence according to the method of FIGS. 4 and 5 is shown. The sequence of FIG. 3 may be performed via the system of FIGS. 1 and 2. The vertical lines at t0-t6 represent times of interest during the sequence.

The first plot from the top of FIG. 3 is a plot of an automatic engine stop request state versus time. The vertical axis represents an automatic engine stop request state. An automatic engine stop is not requested when trace 302 is at a lower level near the horizontal axis. The automatic engine stop is requested when trace 302 is at a higher level near the vertical axis arrow. The horizontal axis represents time and the amount of time increases from the left side of the plot to the right side of the plot. Trace 302 represents the automatic engine stop request state. An automatic engine stop is an engine stop (e.g., cease engine rotation and fueling of the engine) may be initiated via a controller in response to vehicle operating conditions without a driver providing input to a device that has a sole purpose of activating and deactivating the vehicles driveline including the engine, such as a key switch or a pushbutton. An automatic engine stop may be initiated when driver demand torque is less than a threshold, for example.

The second plot from the top of FIG. 3 is a plot of an engine operating state versus time. The vertical axis represents an engine operating state. The engine operating state is not asserted and the engine is not operating (e.g., not rotating and combusting fuel) when trace 304 is at a lower level near the horizontal axis. The engine operating state is asserted and the engine is operating (e.g., rotating and combusting fuel) when trace 304 is at a higher level near the vertical axis arrow. Trace 304 represents engine operating state. The horizontal axis represents time and the amount of time increases from the left side of the plot to the right side of the plot.

The third plot from the top of FIG. 3 is a plot of transmission state (e.g., state of transmission 208 shown in FIG. 2) versus time. The vertical axis represents transmission state. The transmission state is engaged in park (e.g., transmission parking pawl is engaged to prevent vehicle motion) when trace 306 is at a lower level near the horizontal axis. The transmission is engaged in a gear (e.g., $1^{st}$ or reverse) when trace 306 is at a higher level near the vertical axis arrow. Trace 306 represents transmission operating state. The horizontal axis represents time and the amount of time increases from the left side of the plot to the right side of the plot.

The fourth plot from the top of FIG. 3 is a plot of driver proximity state versus time. The vertical axis represents driver proximity state and the vehicle's authorized driver is within the proximity of the vehicle when trace 308 is at a high level near the vertical axis arrow. The vehicle's authorized driver is not within the proximity of the vehicle when trace 308 is at a lower level near the horizontal axis. Trace 308 represents the authorized driver's proximity to the vehicle state. The horizontal axis represents time and the amount of time increases from the left side of the plot to the right side of the plot.

The fifth plot from the top of FIG. 3 is a plot of electric power being supplied to electric power consumers operating state versus time. The vertical axis represents electric power being supplied to electric power consumers operating state and electric power is being supplied to electric power consumers when trace 310 is at a high level near the vertical axis arrow. Electrical power is not being supplied to vehicle electric power consumers when trace 310 is at a low level near the horizontal axis. The power contactor (e.g., 241 of FIG. 2) is open (e.g., electrical power is not conducted through the contactor) when trace 310 is at a lower level near the horizontal axis. The contactor is closed (e.g., electrical power is conducted through the contactor) when trace 310 is at a higher level near the vertical axis arrow. Trace 310 represents the state of electric power being supplied to vehicle electrical power consumers. The horizontal axis represents time and the amount of time increases from the left side of the plot to the right side of the plot.

The sixth plot from the top of FIG. 3 is a plot of battery state of charge (SOC) versus time. The vertical axis represents battery SOC and SOC increases in the direction of the vertical axis arrow. Trace 312 represents battery SOC. Horizontal line 350 represents a threshold state of charge. If the vehicle is automatically stopped and battery SOC falls below threshold 350, the engine may automatically start or a request may be sent to the driver to return to the vehicle so that the engine may be automatically started. The horizontal axis represents time and the amount of time increases from the left side of the plot to the right side of the plot.

The seventh plot from the top of FIG. 3 is a plot of climate control system state (e.g., state of climate control system 289 shown in FIG. 2) versus time. The vertical axis represents climate control system operating state. The climate control system is activated when trace 314 is at the "on" level indicated along the vertical axis. The climate control system is off when trace 314 is at the "off" level indicated along the vertical axis. The fan of the climate control system may remain activated and rotating at a slow speed when the climate control system is off to preserve some air circulation within the passenger compartment of the vehicle. The climate control system is deactivated when trace 314 is at the "deactivated" level indicated along the vertical axis. The fan of the climate control system may not be rotating when the climate control system is deactivated to reduce power consumption. Horizontal line 352 indicates the level where the climate control system is off. Trace 314 represents the operating state of the climate control system. The horizontal axis represents time and the amount of time increases from the left side of the plot to the right side of the plot.

The eighth plot from the top of FIG. 3 is a plot of driver automatic start input state (e.g., state of an input provided by the driver that will automatically start the engine, brake pedal state for example) versus time. The vertical axis represents driver automatic start input state and the driver is providing input for automatically starting the engine and driveline when trace 316 is at a higher level near the vertical axis arrow. The driver automatic start input state is not asserted when trace 316 is at a lower level near the horizontal axis. Trace 316 represents driver automatic start input state. The horizontal axis represents time and the amount of time increases from the left side of the plot to the right side of the plot. The driver automatic start input state may not respond or change in response to a position of an ignition key switch or a pushbutton that has a sole purpose of starting or stopping the engine and the driveline. The driver automatic start input state may be asserted (e.g., high level) in response to a brake pedal or accelerator pedal being applied. Alternatively, driver automatic start input state may change state in response to a position of an ignition key switch, a pushbutton, brake pedal position, and accelerator pedal position. The engine and powertrain may be started and/or activated in response to the driver providing automatic start input (e.g., the driver automatic start input state being asserted or at a higher level).

The ninth plot from the top of FIG. 3 is a plot of driver notification state versus time. The vertical axis represents driver state notification state and the driver state indicates that the driver is being or has been notified of the vehicle's operating state when trace 318 is at a higher level. The vehicle's driver has not been notified of the vehicle's operating state when trace 318 is at a lower level near the horizontal axis. Trace 318 represents driver notification state. The driver may be notified of the vehicle's operating state as discussed in greater detail with regard to FIGS. 4 and 5 via a satellite or cellular network. The horizontal axis represents time and the amount of time increases from the left side of the plot to the right side of the plot.

At time t0, the engine is on and an automatic engine stop request is not being generated. The transmission is engaged in a gear and the driver is in the vehicle's proximity. Power is being supplied to vehicle electric power consumers and SOC is at a high level. The climate control system is on and there is no input being provided to the driver automatic engine start input devices (e.g., accelerator pedal or brake pedal). The driver is not being notified of vehicle operating conditions. Such conditions may be indicative of a vehicle traveling along a road. Just before time t1, the transmission is shifted into park and then an automatic engine stop is requested. The automatic engine stop may be initiated when the vehicle is moving or stationary, but in this example the vehicle is stopped since the transmission is engaged in park. The automatic engine stop may be requested via the controller in response to a low driver demand torque (e.g., accelerator pedal not applied). The driver has not provided input to a device that has a sole function or purpose for starting or stopping the engine (e.g., an ignition key switch or pushbutton) so the driver automatic start input state remains at a low level.

At time t1, the engine is automatically stopped in response to the automatic engine stop request. The transmission remains in park and the driver is proximate to the vehicle. Electric power is being supplied to vehicle power consumers and the SOC is high. The climate control system is also on and the driver is not providing input to automatically start the engine. The driver is not being notified of the vehicle's operating state.

Between time t1 and time t2, the vehicle's driver exits the proximity of the vehicle as is indicated by trace 308 changing to a lower level. The battery SOC is reduced by supplying electric power to the vehicle electrical power consumers and the climate control system output is reduced but not turned off (e.g., the fan speed may be lowered and a desired evaporator temperature may be increased or decreased). The automatic engine stop request remains asserted and the engine remains off. Power continues to be supplied to vehicle electric power consumers so that electrical systems may be continuously updated with data and ready for operation as indicate by trace 310 being at a high level. The driver automatic start input is not asserted and the driver notification is not asserted.

At time t2, the SOC falls below threshold 350 so the driver is notified that electrical power will be cut-off from vehicle electric power consumers if the driver does not return to the vehicle and perform an automatic vehicle starting sequence within a predetermined amount of time. By notifying the driver that electric power will be cut-off (e.g., opening contactor 241 of FIG. 2) if the driver does not perform the automatic vehicle starting process or sequence, the driver is given opportunity to keep vehicle electrical consumers active. The driver may be notified via sending data to a pager, cellular phone, electronic note pad, or other radio frequency receiving device via satellite or cellular network (e.g., a radio frequency network distributed over land through cells where each cell includes a fixed location transceiver).

Between time t2 and time t3, the engine remains automatically stopped and the transmission remains in park. The automatic stop request remains asserted and the driver remains outside of the vehicle's proximity. Electrical power continues to be delivered to vehicle electrical power consumers and the battery SOC continues to decline. The vehicle climate controls remain on at a reduced power consumption level and there is no driver automatic start input. The driver notification state remains asserted to indicate that the driver has been notified of the vehicle's operating conditions. Just before time t3, the driver enters the proximity of the vehicle as is indicated by the driver in vehicle proximity state transitioning to a higher level.

At time t3, the driver remains in proximity of the vehicle and the driver provides input to change the state of the driver automatic start input state. For example, the driver may apply a brake pedal or accelerator pedal to assert the driver automatic start input state. The automatic engine stop request is withdrawn in response to the driver input and the engine is started. The transmission remains in park and electric power continues to be supplied to vehicle electric power consumers. The battery SOC is at a lower level and the driver notification state is withdrawn (not asserted).

Between time t3 and time t4, the battery SOC increases and the transmission is engaged in a gear. The climate control system power consumption level is increased to improve passenger comfort, then it is turned off by the driver. The engine remains started and the automatic engine stop request is not asserted. The driver remains in proximity of the vehicle (e.g., within the passenger compartment) and electric power continues to be supplied to vehicle electric power consumers. The driver notification state remains cleared. Near time t4, the transmission is shifted back into park and the battery SOC has increased well above threshold 350.

At time t4, the automatic engine stop request is asserted a second time. The engine is stopped (e.g., ceases to rotate) shortly thereafter and the transmission remains in park. The driver is in the vehicle's proximity and electrical power is being supplied to vehicle electric power consumers. The battery SOC is at a high level and the climate control system is in an off state. The driver is not asserting the driver automatic start input state and the driver has not been notified of the vehicle operating state.

Between time t4 and time t5, the driver leaves the proximity of the vehicle and the engine remains off. The automatic engine stop request remains asserted and the transmission remains in park. Electrical power is provided to vehicle electric power consumers and the battery SOC is decaying. The climate control system is deactivated to further reduce electric power consumption. The driver is not asserting the driver automatic start input state and the driver has not been notified of the vehicle operating state.

At time t5, the SOC falls below threshold 350 so the driver is notified a second time that electrical power will be cut-off from vehicle electric power consumers if the driver does not return to the vehicle and perform an automatic vehicle starting sequence within a predetermined amount of time. The engine remains stopped and the automatic engine stop request remains asserted. The transmission remains engaged in park and the driver remains outside of the proximity of the vehicle. Electric power continues to be supplied to vehicle electric power consumers and the climate control system remains deactivated. The driver is not supplying input to automatically start the vehicle as is indicated by the low level of the driver automatic start input state. The driver notification state remains asserted since the driver has been notified of vehicle operating conditions.

At time t6, a threshold amount of time has passed since the driver was notified most recently at time t5 so electric power delivery to vehicle electric power consumers is ceased. The engine remains off and the transmission remains in park. The driver remains outside of the vehicle's proximity and the battery SOC is low.

In this way, a driver of a vehicle may be notified of vehicle operating conditions when an engine of a vehicle is automatically stopped so that the driver has an opportunity to keep vehicle electrical power consumers activated so that they may remain updated and ready to operate. The driver may choose to return to the vehicle to ascertain whether or not vehicle conditions are desirable for restarting the engine. This allows the driver to be aware of conditions around the vehicle before the vehicle may be restarted. Further, vehicle electric consumers may remain active while the driver is not proximate to the vehicle so that the vehicle electrical consumers do not have to re-boot.

Referring now to FIGS. 4 and 5, a method for operating an engine is shown. The method of FIGS. 4 and 5 may be stored as executable instructions in controller 12 for the system of FIGS. 1 and 2. Further, the method of FIGS. 4 and 5 may provide the example sequence shown in FIG. 3. In addition, the methods of FIGS. 4 and 5 may work in cooperation with the system of FIGS. 1 and 2 to receive data and adjust actuators to control the system of FIGS. 1 and 2 in the physical or real world.

At 402, method 400 determines vehicle operating conditions. Vehicle operating conditions may be determined via the controller receiving input from the various sensors that are coupled to the controller. Vehicle operating conditions may include but are not limited to driver demand torque, vehicle speed, engine speed, engine load, transmission operating state, ambient temperature, ambient pressure, engine temperature, vehicle speed, battery SOC, climate control system operating state, and driver proximity to the vehicle. Method 400 proceeds to 404.

At 404, method 400 judges if conditions are present to automatically stop the vehicle's engine. In one example, the vehicle's engine may be automatically stopped without a driver providing input to a device that has a sole purpose or function of starting and stopping the vehicle's engine. In other words, method 400 judges if the vehicle's engine should be automatically stopped without the vehicle's driver specifically requesting that the engine stop via an ignition switch or pushbutton. In one example, method 400 may judge that the engine is to be automatically stopped in response to driver demand torque being less than a threshold torque while engine temperature is greater than a threshold temperature. If method 400 judges to automatically stop the engine, the answer is yes and method 400 proceeds to 406. Otherwise, the answer is no and method 400 proceeds to 405.

At 405, method 400 operates the engine and vehicle responsive to operating conditions. For example, the engine torque output may be adjusted responsive to driver demand torque. The driver demand torque may be determined from accelerator pedal position and vehicle speed. Method 400 proceeds to exit.

At 406, method 400 judges whether or not the vehicle's transmission is engaged in park. Method 400 may judge that the vehicle's transmission is engaged in park in response to a value of a variable stored in controller memory. Alternatively, method 400 may determine if the transmission is engaged in park in response to output of one or more sensors. If method judges that the transmission is engaged in park, the answer is yes and method 400 proceeds to 408. Otherwise, the answer is no and method 400 proceeds to 407.

At 407, method 400 automatically stops the vehicle's engine. The vehicle's engine may be automatically stopped via ceasing to supply fuel to the engine via deactivating the engine's fuel injectors. Further, spark delivery to the engine may be ceased. In some examples, method 400 may also apply an electrically operated parking brake if the vehicle is stopped and method 400 may supply electrical power to vehicle electrical consumers. Automatically stopping the vehicle engine includes stopping engine rotation. Method 400 returns to 404.

At 408, method 400 automatically stops the vehicle's engine. The vehicle's engine may be automatically stopped by the controller ceasing to supply fuel to the engine via deactivating the engine's fuel injectors. Further, spark delivery to the engine may be ceased. In some examples, method 400 may also apply an electrically operated parking brake. Method 400 returns to 410.

At 410, method 400 supplies vehicle electric power consumers (e.g., electric devices that receive electric power from the vehicle) electric power via closing an electric contactor (e.g., 241 of FIG. 2). Further, switches that individually control electric power flow to vehicle electric power consumers may be closed so that vehicle electric power consumers may continue to operate. It may be desirable to continue to supply electric power to vehicle electric power consumers when the engine is automatically stopped so that electronic devices have the latest up to date data, to provide lighting to subject matter, allow the vehicle to remain in communication with a base station, and other reasons. For example, it may be desirable for a police vehicle that has had its engine automatically stopped while an officer investigates an accident or crime to keep its vehicle electric power consumers activated so that the officer has the latest information immediately available when the officer returns to the vehicle. Method 400 proceeds to 412.

At 412, method 400 judges whether or not there is an indication that the vehicle's driver has left the proximity of the vehicle. In one example, an indication that the vehicle's driver has left the proximity of the vehicle may be generated when a signal from a key fob ceases to be detected by a receiver or controller. If the driver exits the vehicle with the key fob, the receiver or controller may detect the driver's absence via an absence of a radio frequency signal from the key fob. In another example, an indication that the vehicle's driver has left the proximity of the vehicle may be generated when a signal from a vehicle door switch indicates that the vehicle's door has opened after the engine was automatically stopped. In still another example, an indication that the vehicle's driver has left the proximity of the vehicle is generated when a signal from a seat switch indicates that the driver is not occupying the driver's seat. If method 400 judges that there is an indication that the driver has left the proximity of the vehicle, the answer is yes and method 400 proceeds to 414. Otherwise, the answer is no and method 400 returns to 407.

At 414, method 400 judges if the vehicle climate control system is off. In one example, method 400 may judge that the climate control system is off based on input received by the controller from the climate control system. If method 400 judges that the climate control system is off, the answer is yes and method 400 proceeds to 417. Otherwise, the answer is no and method 400 proceeds to 416.

At 416, method 400 reduces output of the climate control system to reduce electric power consumption. In one example where the climate control system includes a heat pump, method 400 may reduce or increase a desired temperature of an evaporator or a condenser to reduce electric energy consumption. Further, method 400 may reduce speed of a climate control fan. Method 400 proceeds to 418.

At 417, method 400 deactivates the climate control system to reduce electric power consumption. In one example, method 400 deactivates a fan that circulates air within the passenger compartment of the vehicle to reduce electric energy consumption and deactivate the climate control system. Method 400 proceeds to 418.

At 418, method 400 judges if battery state of charge (SOC) is less than a threshold state of charge. In one example, method 400 may determine battery SOC via measuring a voltage of the battery and coulomb counting. If method 400 judges that battery SOC is less than a threshold, the answer is yes and method 400 proceeds to 420. Otherwise, the answer is no and method 400 returns to 410.

Alternatively, or in addition, method 400 may judge if a threshold amount of time has been exceeded since a most recent time when an indication was generated that the driver has left the proximity of the vehicle. If so, the answer is yes and method 400 proceeds to 420. Otherwise, the answer is no and method 400 returns to 410.

At 420, method 400 transmits an indication to the driver that shutdown of vehicle electric power consumers is pending and that the driver has a predetermined amount of time to return to the vehicle to prevent disconnecting electric power from the vehicle electric power consumers. Method 400 may transmit the indication or notification to the driver via satellite, paging network, radio frequency, cellular network, or other radio frequency network via a transceiver or transmitter. Method 400 may also update the driver with other useful vehicle data at the time the notification is generated. In some examples, method 400 may also provide instructions to the driver to automatically start the vehicle by applying vehicle brakes or an accelerator pedal. For example, method 400 may instruct the driver to apply the brake pedal or accelerator pedal to automatically start the engine without using an input device that is dedicated to solely start or stop the vehicle's engine. Method 400 may also record a time that the notification was sent to the driver. Method 400 proceeds to 422.

In some examples, the driver may also be offered an opportunity to extend a predetermined amount of time that the driver has to return to the vehicle and automatically start the engine after being notified that the shutdown of the vehicle electric power consumers is pending. The driver may be prompted to select electric power consumers that may be shutdown immediately to increase the predetermined amount of time that the driver has to return to the vehicle before electric power is cut-off to the vehicle electric power consumers. For example, the driver may elect to deactivate a cooler, lights, and in infotainment system while allowing a computer and two-way radio to remain active. The driver may transmit data to controller 12 via mobile device 265 to indicate which vehicle electric consumers to deactivate (e.g., cease to supply with electrical power) immediately. Controller 12 may then open one or more of switches 242-246 to deactivate one or more of devices 250-254.

At 422, method 400 begins tracking an amount of time since the driver was notified that shutdown of vehicle electric power consumers (e.g., ceasing to supply electrical power to the vehicle electric power consumers) is pending at 420. Tracking the amount of time since the driver was notified most recently may allow the controller to provide notice to the driver so that the driver may take mitigating actions and constrain electrical power consumption.

Alternatively, or in addition, method 400 may determine an amount of electric power that has been consumed since the driver was notified that shutdown of the vehicle electric power consumers is pending. Method 400 proceeds to 424.

At 424, method 400 judges if the driver has performed actions to automatically restart the engine. In one example, method 400 may judge if the driver has applied a brake pedal or accelerator pedal to initiate the automatic engine restart. If method 400 judges that the driver has performed actions to automatically start the engine, the answer is yes and method 400 proceeds to 425. Otherwise, if method 400 judges that the driver has not performed the actions to automatically restart the engine, the answer is no and method 400 proceeds to 426.

At 425, method 400 optionally judges if the identity of the driver (e.g., authorized user) has been confirmed. In one example, the identity of the driver may be confirmed via the driver entering the proximity of the vehicle with a key fob. The key fob may transmit a data sequence that may be verify the driver's identity or deny the driver's identity. If the data sequence transmitted by the key fob is an expected data sequence, then the driver's identity may be verified. If the data sequence transmitted by the key fob is not the expected data sequence or if a sequence is not transmitted, then the driver's identity may not be verified. In addition, the key fob may also perform biometric verification that the driver is the authorized user by confirming that the key fob holder's biometric signature conforms to the authorized user's biometric signature. If method 400 judges that the driver's identity has been confirmed or verified, the answer is yes and method 400 proceeds to 450. Otherwise, the answer is no and method 400 proceeds to 426.

At 450, method 400 automatically restarts the engine and continues supplying electric power to vehicle electric consumers. The engine may be restarted via rotating the engine via a starter or other electric machine and supplying spark and fuel to the engine. Method 400 proceeds to exit.

At 426, method 400 judges if the amount exceeds a threshold amount of time. In particular, method 400 judges if an amount of time since the driver was most recently notified that vehicle electric power consumer shutdown is pending exceeds a threshold amount of time. If so, the answer is yes and method 400 proceeds to 428. Otherwise, the answer is no and method 400 returns to 424. Alternatively, or in addition, method 400 may judge if an amount of electric power consumed by vehicle electric power consumers exceeds a threshold amount of power. In particular, method 400 may judge if more than a threshold amount of electrical power has been delivered to the vehicle electric power consumers since the driver was most recently notified that vehicle electric power consumer shutdown is pending exceeds a threshold amount of power. If so, the answer is yes and method 400 proceeds to 428. Otherwise, the answer is no and method 400 returns to 424.

At 428, method 400 ceases supplying electric power to select vehicle electric consumers. In one example, method 400 may open a contactor (e.g., contactor 241 of FIG. 2) to cease delivery of electric power to vehicle electric power consumers. Method 400 proceeds to exit.

In this way, electric power may be supplied to vehicle electric power consumers after an engine of the vehicle has been automatically stopped while a transmission of the vehicle is engaged in park. The electric power may be supplied after the vehicle's driver has left the proximity of the vehicle until battery state of charge has been reduced to a threshold amount of charge, then the vehicle's driver may be notified of a pending disconnect of electric power from the vehicle electric power consumers. If the driver returns to the vehicle and provides input to automatically restart the engine, the engine may be started and the vehicle electric power consumers may continue to receive electric power. If the driver does not return to the vehicle and provide the input to automatically start the vehicle within a predetermined amount of time, the vehicle electric power consumers may be disconnected from vehicle electric power.

Thus, the method of FIGS. 4 and 5 provides for a method for operating an engine, comprising: automatically stopping an engine via a controller; and via the controller, sending a notification to a human driver of a vehicle while the engine is automatically stopped that one or more electric power consumers coupled to a vehicle will be deactivated in a predetermined amount of time unless the human driver performs an engine reactivation procedure at the vehicle, the human driver not occupying the vehicle. The method includes where sending notification to the human driver includes sending a text message to a cellular phone of the human driver. The method includes where sending notification to the human driver includes sending a message to a pager of the human driver. The method includes where sending notification to the human driver includes sending a data message to a software application of a cellular phone of the human driver. The method includes where sending a notification includes sending an indication of an amount of time until the one or more electric power consumers is deactivated to the human driver. The method further comprises deactivating the one or more electric power consumers via opening a contactor in response to the human driver not performing the engine reactivation procedure. The method includes where the engine reactivation procedure comprises applying a brake pedal or an accelerator pedal. The method includes where sending notification to the human driver includes sending data to a satellite. The method further comprises receiving notification via the controller from the human driver to deactivate one or more of the electric power consumers to extend the predetermined amount of time.

The method of FIGS. 4 and 5 also provides for a method for operating an engine, comprising: automatically stopping an engine via a controller; via the controller, sending a notification to a human driver of a vehicle while the engine is automatically stopped that one or more electric power consumers electrically coupled to a vehicle will be deactivated in a predetermined amount of time unless the human driver performs an engine reactivation procedure at the vehicle, the human driver not occupying the vehicle; and evaluating an identity of the human driver occupying the vehicle after sending the notification. The method includes where evaluating the identity of the human driver includes the controller receiving a security token (e.g., unique data set) from a key fob. The method includes where the engine reactivation procedure includes the human driver entering a proximity of the vehicle with a key fob. The method further comprises only automatically starting the engine after the evaluation confirms the identity of the human driver. The method further comprises only supplying electrical power to the one or more electric power consumers after the engine is automatically stopped and the human driver exits the vehicle when the vehicle's transmission is engaged in park.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   via a controller, automatically stopping the engine;
   sending a notification to a human driver of a vehicle while the engine is automatically stopped that one or more electric power consumers coupled to the vehicle will be deactivated in a predetermined amount of time unless the human driver performs an engine reactivation procedure at the vehicle, where the human driver is not occupying the vehicle; and
   receiving notification via the controller from the human driver to deactivate the one or more electric power consumers to extend the predetermined amount of time.

2. The method of claim 1, where sending the notification to the human driver includes sending a text message to a cellular phone of the human driver.

3. The method of claim 1, where sending the notification to the human driver includes sending a message to a pager of the human driver.

4. The method of claim 1, where sending the notification to the human driver includes sending a message to a software application of a cellular phone of the human driver.

5. The method of claim 1, where sending the notification includes sending an indication of the predetermined amount of time until the one or more electric power consumers is deactivated to the human driver.

6. The method of claim 1, further comprising deactivating the one or more electric power consumers via opening a contactor in response to the human driver not performing the engine reactivation procedure.

7. The method of claim 6, where the engine reactivation procedure comprises applying a brake pedal or an accelerator pedal.

8. The method of claim 1, where sending the notification to the human driver includes sending data to a satellite.

9. A method for operating an engine, comprising:
   via a controller, automatically stopping the engine;
   sending a notification to a human driver of a vehicle while the engine is automatically stopped that one or more electric power consumers coupled to the vehicle and receiving electrical power from an electrical energy storage device will be deactivated in a predetermined amount of time unless the human driver performs an engine reactivation procedure at the vehicle, the human driver not occupying the vehicle; and
   evaluating an identity of the human driver occupying the vehicle after sending the notification.

10. The method of claim 9, where evaluating the identity of the human driver includes the controller receiving a token from a key fob.

11. The method of claim 9, where the engine reactivation procedure includes the human driver entering a proximity of the vehicle with a key fob.

12. The method of claim 9, further comprising only automatically starting the engine after the evaluation confirms the identity of the human driver.

13. The method of claim 9, further comprising only supplying electrical power to the one or more electric power consumers after the engine is automatically stopped and the human driver exits the vehicle when a transmission of the vehicle is engaged in park.

14. A vehicle system in a vehicle, comprising:
   an engine;
   one or more electrical energy consumers that are in selective electrical communication with an electric energy storage device; and
   an engine controller coupled to the engine, the engine controller including executable instructions stored in non-transitory memory to:
     automatically stop the engine via the controller;
     determine an electric energy device state of charge; and
     when a human driver is not occupying the vehicle, notify the human driver that the one or more electrical energy consumers will be deactivated when the human driver does not perform an engine starting procedure within a predetermined amount of time.

15. The vehicle system of claim 14, where notifying the human driver includes sending data to the human driver via a cellular communication network.

16. The vehicle system of claim 14, where notifying the human driver includes sending data to the human driver via a satellite.

17. The vehicle system of claim 14, where notifying the human driver includes sending data to the human driver via a radio frequency.

18. The vehicle system of claim 14, further comprising additional executable instructions stored in the non-transitory memory to automatically start the engine in response to the human driver performing the engine starting procedure.

19. The vehicle system of claim 18, further comprising additional executable instructions stored in the non-transitory memory to verify an identity of the human driver before automatically starting the engine.

* * * * *